Dec. 2, 1941.    T. P. BELL    2,264,788
HARROW
Filed July 24, 1940    2 Sheets-Sheet 1

Inventor
Thomas Polk Bell
By Clarence A. O'Brien
Attorney

Dec. 2, 1941.  T. P. BELL  2,264,788
HARROW
Filed July 24, 1940  2 Sheets-Sheet 2
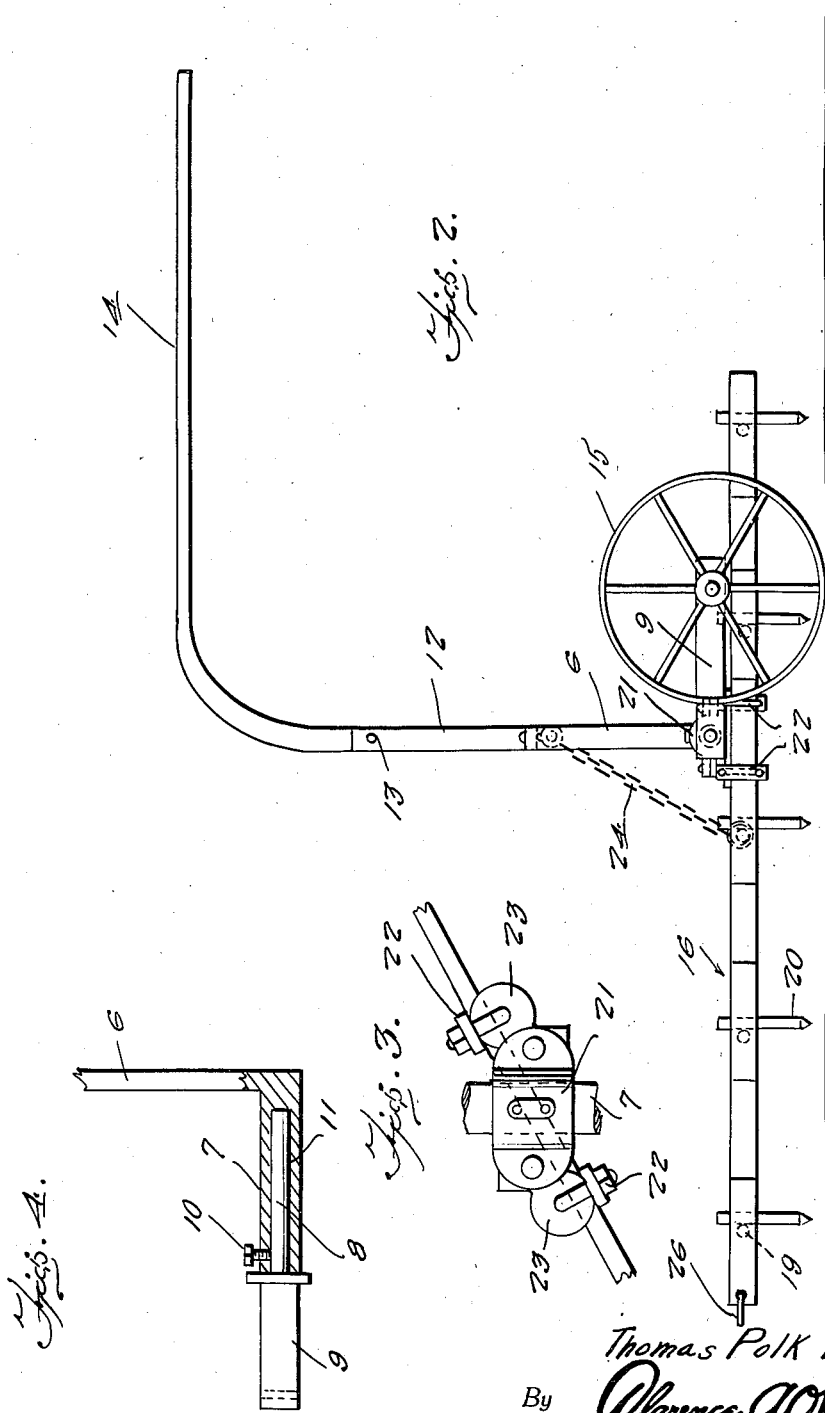
Inventor
Thomas Polk Bell
By Clarence A. O'Brien
Attorney Patented Dec. 2, 1941

2,264,788

UNITED STATES PATENT OFFICE 2,264,788

HARROW

Thomas Polk Bell, El Dorado, Ark.

Application July 24, 1940, Serial No. 347,283

2 Claims. (Cl. 55—19)

This invention relates to agricultural implements and more particularly to field harrows.

An object of the present invention is to provide an adjustable field harrow of the tooth type, and which will embody many improvements over similar harrows now known or used.

The invention together with its objects and advantages will be best understood from a study of the following description taken in connection with the accompanying drawings wherein:

Figure 2 is a side elevational view thereof.

Figure 3 is a fragmentary detail plan view showing the manner of securing a frame member to an axle forming part of the invention, and Figure 4 is a fragmentary detail view partly in section and partly in elevation showing the manner of securing an axle, adjustably, to a brace bar forming part of the invention.

Figure 1:
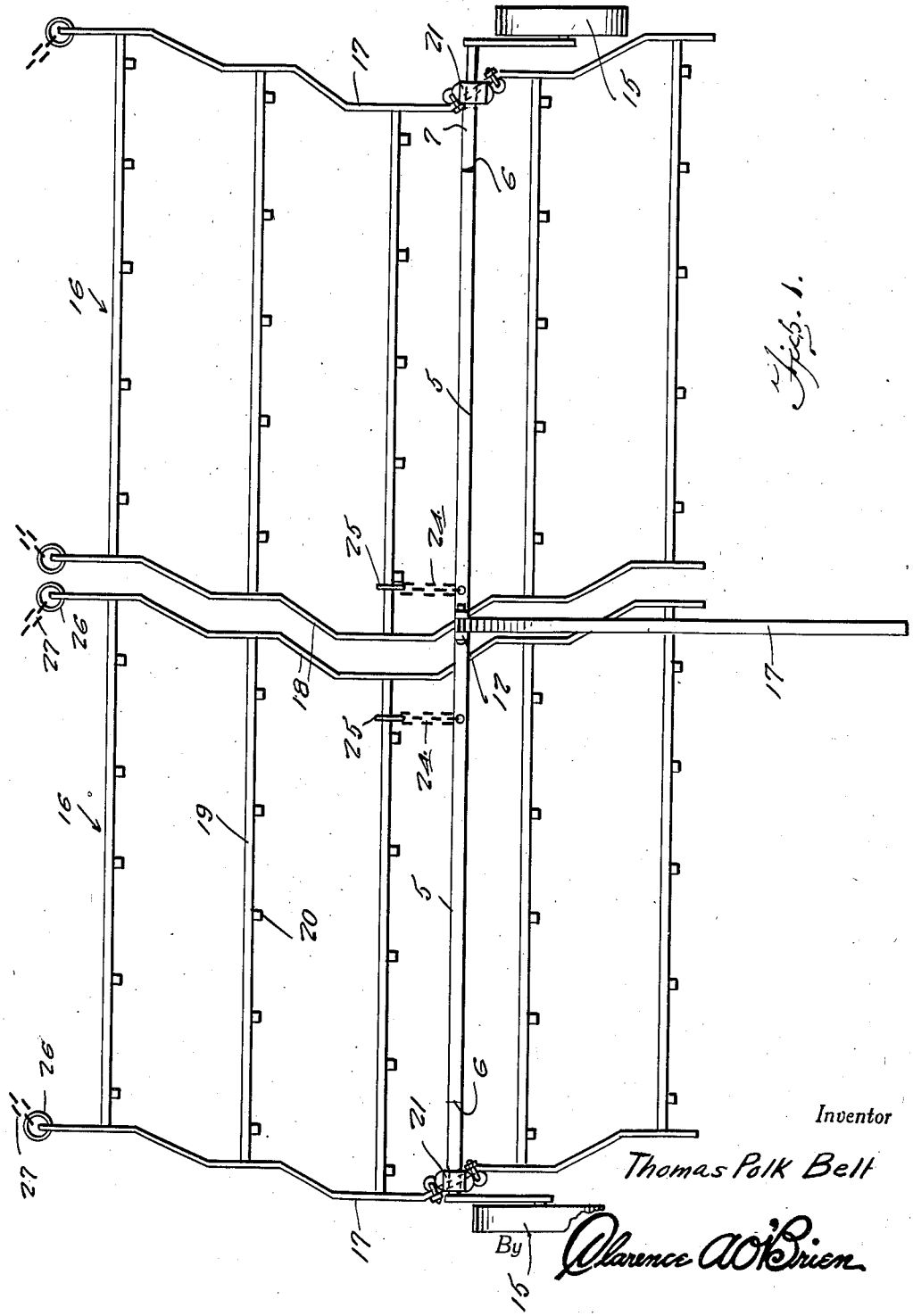
Figure 1 is a plan view of a harrow embodying the features of the present invention.

Referring more in detail to the drawings it will be seen that in the preferred embodiment thereof the harrow comprises a pair of transversely aligned brace bars 5—5, and each of these bars at one end is downwardly directed as at 6 and then laterally or longitudinally extended as at 7.

The end 7 of each brace bar is provided with an axial socket 11 to receive the shank 8 of a crank axle 9. The shank 8 is secured in adjusted position in the socket by a set screw 10.

At their inner or adjacent ends the brace bars 5 have upstanding terminals 12 between which is bolted or otherwise secured as at 13 one end of a handle member 14.

Each crank axle 9 provides an arm and a spindle and said spindle has mounted thereon a traction and supporting wheel 15.

In accordance with the present invention there are provided two gangs 16; each tooth-gang 16 embodying a pair of substantially sinuous side bars 17, 18 connected at intervals through the medium of cross-bars 19 to which are secured harrow teeth 20; the teeth 20 of one bar being staggered with respect to the teeth of an adjacent bar so that a staggered arrangement of teeth as shown in Figure 1 is provided.

Each gang 16 has its outer side member secured to the end 7 of a brace bar through the medium of a two-part bearing 21 and U clamps 22. In this connection, and referring to Figure 3, it will be seen that each bearing 21 receives the end 7 of a brace bar 5 and the bearing is provided at opposite ends thereof with apertured ears 23 arranged somewhat on the diagonal relative to one another and accommodating the U clamps 22 which embrace a side member 17 of a gang as will be clear from a study of Figures 3 and 2.

Adjacent the inner sides thereof the gangs 16 are suspended from the brace members 5 through the medium of lengths of chain 24 that at one end are suitably anchored to the members 5 and at an opposite end are equipped as at 25 for detachable engagement with selected cross members 9 of the respective gangs 16 as shown in Figure 1.

As will be seen the members 5 with the depending parts 6 form an inverted yoke-shaped member with the outwardly extending end portions 7 passing through the bearings 21 at the outer sides of the harrow frames and with the crank axles 9 connected with the outer ends of these parts 7 and having the wheels carried by the spindles of the crank axles. Thus by moving the yoke by means of the handle 14 the crank axles are swung upwardly or downwardly so that the harrow frames are raised and lowered as the crank axles fulcrum on the wheels. The chains 24 connecting the upper portions of the yoke with forward portions of the harrow frames also act to raise or lower the frames as the yoke is rocked in one direction or the other. Thus an operator can by manipulating the handle 14 elevate or lower the harrows as desired for controlling the depth of penetration of the teeth in the ground or he can cause the teeth to be raised above the ground.

It will also be apparent that a harrow embodying the features of the present invention is relatively simple in construction; can be easily assembled and disassembled; and yet will meet all the requirements of a harrow of this general type.

Also for connecting the harrow to suitable draft means, such as draft animals, or a draft vehicle, the side members 17 and 18 of the respective gangs 16 at one end are suitably equipped with rings 26, or otherwise, to accommodate draft chains or the like 27.

It is thought that a clear understanding of the construction, utility and advantages of a harrow embodying the features of the present invention will be had without a more detailed description thereof.

Having thus described the invention what is claimed as new is:

1. In a harrow of the class described, an inverted yoke-shaped member having outwardly extending horizontal parts at the lower ends of its limbs, harrow frames, bearing members on the outer sides of said frames intermediate the ends thereof through which said horizontal parts pass, arms extending at right angles from the outer ends of said horizontal parts, spindles on the free ends of said arms, wheels carried by the spindles, flexible members connecting inner portions of the harrow frames with the bight of the yoke-shaped member and a handle connected with the bight for rocking the yoke-shaped member to raise and lower the harrow frames.

2. In a harrow of the class described, a pair of harrow frames, bearing members attached to the outer sides of the frames intermediate the ends thereof, an inverted yoke-shaped member, horizontal and outwardly extending shafts connected with the lower ends of the limbs of the yoke-shaped member and passing through the bearing members, arms extending at right angles from the shafts and adjustably connected therewith, spindles at the free ends of said arms, wheels carried by the spindles, chains connecting the bight of the yoke-shaped member with inner portions of the harrow frames, an upstanding member connected with the central part of the bight of the yoke-shaped member and a handle connected with the upstanding member and extending rearwardly for permitting the yoke-shaped member to be rocked to raise and lower the frames.

THOMAS POLK BELL.